United States Patent
Olshavsky et al.

(10) Patent No.: US 6,169,044 B1
(45) Date of Patent: Jan. 2, 2001

(54) CONTAINER FOR THE SELECTIVE SCAVENGING OF CITRUS JUICE COMPONENTS

(75) Inventors: Michael Olshavsky, Cincinnati; Gene Bartholomew, Milford, both of OH (US); Elizabeth Cornelius, New Windsor; Henry Mei, New City, both of NY (US)

(73) Assignee: International Paper Company, Tuxedo, NY (US)

(*) Notice: Under 35 U.S.C. 154(b), the term of this patent shall be extended for 0 days.

(21) Appl. No.: 09/301,013

(22) Filed: Apr. 28, 1999

(Under 37 CFR 1.47)

(51) Int. Cl.[7] .................................................. B32B 5/18
(52) U.S. Cl. ........................... 442/76; 442/149; 442/151; 261/2; 426/330.5; 28/167
(58) Field of Search .................................. 28/167; 261/2; 442/76, 151, 149; 426/330.5

(56) References Cited

U.S. PATENT DOCUMENTS

| | | | |
|---|---|---|---|
| 3,989,854 | * 11/1976 | Chandler et al. | 426/422 |
| 4,007,138 | * 2/1977 | Kanig | 260/2.1 |
| 4,439,458 | * 3/1984 | Puri | 426/330.5 |
| 4,794,036 | * 12/1988 | Tate | 428/263 |
| 4,797,310 | * 1/1989 | Barby et al. | 428/71 |
| 4,902,308 | * 2/1990 | Mallouk et al. | 55/16 |
| 5,037,624 | * 8/1991 | Tom et al. | 423/210 |
| 5,049,402 | * 9/1991 | Tamaki et al. | 426/599 |
| 5,263,409 | 11/1993 | van Eikeren et al. | |
| 5,519,064 | 5/1996 | Stringfield et al. | |
| 5,683,800 | 11/1997 | Stringfield et al. | |
| 5,747,174 | * 5/1998 | Kimura et al. | 428/480 |
| 5,817,354 | * 10/1998 | Mozaffar et al. | 426/271 |
| 6,045,842 | * 4/2000 | Mozaffar et al. | 426/271 |

* cited by examiner

Primary Examiner—Blaine Copenheaver
Assistant Examiner—Arti R. Singh
(74) Attorney, Agent, or Firm—Stewart L. Gitler; Michael J. Doyle

(57) ABSTRACT

A laminate structure for use as a container for liquids including a structural substrate such as a paperboard which facilitates a gable top container having incorporated on its inner surface a layer of a fibrous matrix which has encapsulated or incorporated therein a finely ground divinylbenzene ethyl vinylbenzene copolymer, polystyrene divinylbenzene copolymer resin or a cyclodextrin placed on its inner surface. Additionally, the fibrous matrix may be produced as an insert and attached to the inner surface of the gable top container through the use of various items such as hot melt adhesives.

6 Claims, 1 Drawing Sheet

CONTAINER FOR THE SELECTIVE SCAVENGING OF CITRUS JUICE COMPONENTS

BACKGROUND OF THE INVENTION

The invention concerns the selective scavenging of citrus juice components in consumer packaging. Taste tests conducted by citrus juice producers have shown that consumers prefer grapefruit juice of a less bitter nature. While the compounds responsible for the bitter taste can be removed in batch processes either enzymatically or by column adsorption, the capital, time, and space required for these processes has been a deterrent for large scale production.

Additionally, the control over the extent or level (percentage) of debittering per batch obtained is poor. For example, the aforementioned processes typically yield a 100% debittered batch, which can then be reblended with appropriate amounts of untreated juice to provide a resultant product which is reduced in bitterness.

Bitterness in citrus fruits and their products is due to limonoid principals, predominantly limonin, and/or flavonoid principals, predominantly naringin and neohesperidin.

The distribution of limonoid and flavonoid bitter principals varies from fruit to fruit. In grapefruit juice, flavonoids and liminoids are both present.

Various approaches have been made to counteract these bitterness components. In the article entitled, "Bitterness Reduction in Grapefruit Juice Through Active packaging", the authors disclose the use of cellulose acetate films and their use as a gel layer on the internal walls of a PVC bottle or container to adsorb the unwanted limonin and enzymatically hydrolyzed naringin.

Chandler et al, U.S. Pat. No. 3,989,854, discussed using cellulose esters, such as cellulose acetate and/or cellulose acetate butyrate, as adsorbents which contact the fruit juice. The adsorbent according to Chandler et al is preferably in gel form and is typically in a column. Therefore, this is a method wherein the juice is pretreated prior to its filling into the package itself.

The prior attempts to address the bitterness has not produced the success desired by the consumer and as such a solution to the problem has been sought out.

It is therefore an object of the invention to produce a liquid package which increases the consumer preference for the product contained therein.

It is a further object of the present invention to produce a package which would remove the bitter components such as naringin and limonin from juice.

SUMMARY OF THE INVENTION

The invention involves the incorporation of a selective scavenger into a package unit which has the capacity to remove targeted undesirable components. More particularly, there is disclosed use of a fibrous matrix of physically encapsulating finely ground, divinylbenzene ethyl vinylbenzene copolymer, polystyrene divinylbenzene copolymer, cross linked polymer resins, into a fibrous matrix structure such as paperboard or a non-woven material. This fibrous matrix is then folded and placed as an insert into a gable top carton, or laminated onto the side panel of the carton, such that the carton can be filled with the product. In this manner, the divinylbenzene ethylvinylbenzene copolymer or powdered polystyrene divinylbenzene copolymer is allowed to have intimate contact with the aqueous juice medium, but physically retained within a paper matrix and prevented from migrating freely into the bulk juice product.

DETAILED DESCRIPTION OF THE INVENTION

Figure 1:
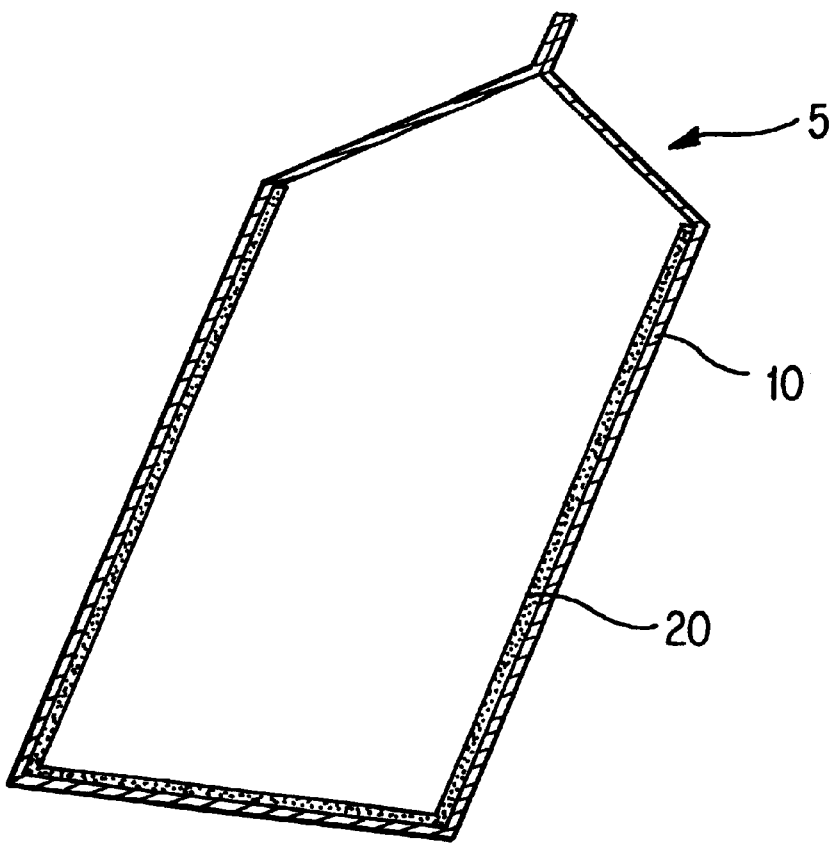
FIG. 1 is a cross-sectional view of a gable top carton embodying a preferred embodiment of the invention.

According to the present invention there is provided a selective scavenger, in a specific amount, in a package unit, which has the capacity to remove targeted undesirable components. The selective scavenger can be an integral part of the product containing carton, or a separate structure contained within the carton. FIG. 1 depicts a structure showing a gable top carton having a structural substrate 10 of a material such as paper or paperboard and a fibrous matrix 20. This fibrous matrix 20 provides a method to remove undesirable components in citrus juices without incurring capital costs, and without requiring storage time in containment tanks. The matrix can be an insert or can be laminated directly to the container substrate.

The preferred embodiment of the invention utilizes a physically encapsulating finely ground, divinylbenzene ethyl vinylbenzene copolymer, or polystyrene divinylbenzene copolymer, cross-link polymer resins, which are integrated into a fibrous matrix structure such as paperboard or non-woven materials. This fibrous matrix is then folded and placed as an insert into a gable top carton, or laminated onto the side panel of the carton, such that the carton can be filled with the product. In this manner, the powdered polystyrene divinylbenzene copolymer is allowed to have intimate contact with the aqueous juice medium, but is physically retained within a paper matrix and prevented from migrating freely into the bulk juice product.

Bitter components are adsorbed out of the juice into the hydrophobic pores present in the divinylbenzene ethyl vinylbenzene copolymer, or polystyrene divinylbenzene copolymer resin. These components migrate into the divinylbenzene ethyl vinylbenzene copolymer or polystyrene divinylbenzene copolymer resin through a diffusion limited process and are physically bound through only hydrophobic interactions.

The fibrous structural material can be made by combining the divinylbenzene ethyl vinylbenzene copolymer or polystyrene divinylbenzene copolymer with water, cellulose or other synthetic fibers, such as polyester or fiberglass, polymer latex binders, and various wet strength or other chemical agents. The mixture is poured into a mold and dried to form a flat, sheet-like structure. The resultant structure is porous, retains its structural integrity when wet, and the adsorption properties of divinylbenzene ethyl vinylbenzene copolymer, or polystyrene divinylbenzene copolymer remain unaffected. This paper composite structure utilizes divinylbenzene ethyl vinylbenzene copolymer, or polystyrene divinylbenzene copolymer which may vary in degrees of crosslinking from 16 to 65%, which has been ground into a powder that has average particle sizes no larger than 0.05 mm. The composite is formulated to contain between 3–60 grams of divinylbenzene ethyl vinylbenzene copolymer or polystyrene divinylbenzene copolymer per square foot of paper.

A preferred divinylbenzene ethyl vinylbenzene copolymer resin contains up to 79% divinylbenzene and from 15–20% ethyl vinylbenzene.

It is also contemplated as an alternate embodiment of the invention, that a material, such as a cyclodextrin, can be used in substitution of the divinylbenzene ethyl vinylbenzene copolymer or polystyrene divinylbenzene copolymer. This material will remove the bitter components present in grapefruit juice in a similar fashion to the divinylbenzene ethyl vinylbenzene copolymer or polystyrene divinylbenzene copolymer.

Alternative methods for dispersing the adsorbent materials may include applying the adsorbent materials in an aqueous binder to a paperboard structure using a coating such as a roll coating, a rod coating technique, a blade coating technique, a spray coating technique, or a printing technique. Another method might utilize the coextrusion of a blended polyethylene and adsorbent layer onto paperboard stock. The adsorbent material could also be incorporated into a permeable pouch or satchel and attached into the carton through the use of a hot melt adhesive. Additionally, a reactive extrusion method may be used to coat paperboard as a foamed layer of adsorbent material.

Figure 2:
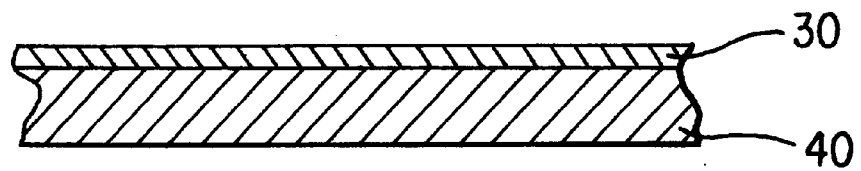
FIG. 2 depicts a cross-sectional view of a laminate structure for use as a container embodying the present invention.

FIG. 2 illustrates a laminate structure for use as a container wherein the structural substrate 40 has coated on its inner side, a fibrous matrix 30.

The invention addresses a method of removing the bitter limonin or flavonoids from the juices by contacting same with an adsorbent material, such as finely ground, divinylbenzene ethyl vinylbenzene copolymer, polystyrene divinylbenzene copolymer or cyclodextrin which is encapsulated in a fibrous matrix. The matrix is located in the carton as an insert or directly laminated to the carton substrate.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A laminate structure for liquids comprising a structural substrate having an outer and an inner surface, and a layer of a fibrous matrix having incorporated therein a finely ground divinylbenzene ethyl vinylbenzene copolymer, polystyrene divinylbenzene copolymer resin or cyclodextrin placed on the inner surface of the structural substrate.

2. The laminate structure as claimed in claim 1, wherein the fibrous matrix is laminated onto the inner surface of the structural substrate.

3. The laminate structure as claimed in claim 1, wherein the fibrous matrix is an insert placed in direct contact with the inner surface of the structural substrate.

4. The laminate structure as claimed in claim 3, wherein the fibrous matrix is attached to the inner surface of the structural substrate by a hot melt adhesive.

5. The laminate structure as claimed in claim 1, wherein the fibrous matrix is a paperboard structure coated with a composite of the finely ground divinylbenzene ethyl vinylbenzene copolymer, poly styrene divinylbenzene copolymer resin or cyclodextrin in an aqueous binder.

6. The laminate structure as claimed in claim 5, wherein the composite is applied to the paperboard structure using a coating roll, a rod coating technique, a blade coating technique.

* * * * *